United States Patent [19]

Komurasaki

[11] Patent Number: 5,144,928
[45] Date of Patent: Sep. 8, 1992

[54] IGNITION TIMING CONTROL APPARATUS WITH A KNOCK SENSOR FOR AN INTERNAL COMBUSTION ENGINE

[75] Inventor: Satoshi Komurasaki, Himeji, Japan

[73] Assignee: Mitsubishi Denki Kabushiki Kaisha, Tokyo, Japan

[21] Appl. No.: 734,711

[22] Filed: Jul. 23, 1991

[30] Foreign Application Priority Data

Aug. 9, 1990 [JP] Japan .................................. 2-209243

[51] Int. Cl.$^5$ ............................................. F02P 5/145
[52] U.S. Cl. .................................................... 123/425
[58] Field of Search ...................... 123/425, 435; 73/35

[56] References Cited

U.S. PATENT DOCUMENTS

| | | | |
|---|---|---|---|
| 4,409,937 | 10/1983 | Asano | 123/425 |
| 4,418,567 | 12/1983 | Boning et al. | 73/35 |
| 4,606,316 | 8/1986 | Komurasaki | 123/425 |
| 4,621,602 | 11/1986 | Furuyama | 123/425 |
| 5,060,615 | 10/1991 | Hashimoto et al. | 123/425 |

Primary Examiner—Tony M. Argenbright
Attorney, Agent, or Firm—Sughrue, Mion, Zinn, Macpeak and Seas

[57] ABSTRACT

An ignition timing control apparatus for an internal combustion engine can precisely sense an abnormality or fault in a knock sensing system, and properly control the ignition timing so as to prevent any possible knocking even if there is an abnormality in the knock sensing system. The apparatus includes a first switch for controlling the power supply to an ignition coil, a signal generator for generating an ignition signal in synchrony with the rotation of the engine to open and close the swtich, a resonance type acceleration senor for sensing a vibrational acceleration of the engine and generating a corresponding output signal, a controller for controlling the first switch based on the output signal of the acceleration sensor so that the engine is properly ignited by the ignition coil, a capacitance load having one end connected through a second switch to the output side of the acceleration sensor and the other end thereof connected to ground, an abnormality sensor for sensing an abnormality in a knock sensing system including the acceleration sensor and the controller based on a change in the output of the acceleration sensor in response to the closure of the second switch, whereby the controller controls the first switch based on the output signal from the abnormality sensor in such a manner that it retards the ignition timing of the engine by a prescribed extend from a normal ignition timing at which ignition takes place when there is no output from the abnormality sensor.

5 Claims, 7 Drawing Sheets

→ TIME

→ TIME

IGNITION TIMING CONTROL APPARATUS WITH A KNOCK SENSOR FOR AN INTERNAL COMBUSTION ENGINE

BACKGROUND OF THE INVENTION

The present invention relates to an ignition timing control apparatus for an internal combustion engine, and more particularly, it relates to an ignition timing control apparatus for sensing an abnormality in a knock sensor in the form of a vibrational acceleration sensor.

Generally, it is desirable to set the ignition timing of an internal combustion engine in such a manner as to maximize the operating efficiency of the engine. Thus, it is general practice to set the ignition timing as close as possible to a maximum advance angle or position within an allowable range in which there takes place no knocking in the engine. In this connection, however, most of conventional ignition timing control apparatuses are of the mechanical type and generally have non-uniform and unstable ignition advance characteristics due mainly to relatively significant variations in manufacture and gradual changes in quality over time. Accordingly, in order to prevent possible knocking in the engine, there is a tendency that ignition timing is in effect set at a point considerably retarded from the most desirable advance position.

In this case, however, the operating efficiency of the engine is reduced. In addition, even in the event that ignition timing is set to a point at which there will be no knocking in a certain operating condition of the engine, by use of an ignition timing control apparatus, which is precisely manufactured with uniform quality and is highly resistant to time-dependent changes, there still exists a probability of engine knocking because whether knocking will take place or not depends on many factors such as the temperature and humidity of intake air, the air/fuel ration of a mixture, etc.

However, such a probability can be eliminated by sensing knocking in an engine and properly controlling the ignition timing in an ignition retarding direction if it is sensed. According to this ignition control, it becomes possible to properly control the ignition timing so as to prevent knocking even if there are variations in the ignition advance characteristics of ignition control timing apparatuses due to mechanical variations among them or due to changes in the engine operating condition. To this end, a reference ignition timing, at which ignition usually takes place when there is no knocking, is set to a point close to the maximum advance position, and if knocking takes place, ignition timing is appropriately retarded to provide optimum ignition timing for preventing the knocking.

Even with this type of ignition timing control apparatus, there arises a problem when a knock sensing system becomes abnormal or faulty. Specifically, if there develops an abnormality in the knock sensing system, no information about knocking could be obtained, so it becomes impossible to perform accurate ignition retarding control for knocking suppression if the engine is knocking. As a result, the engine is subject to severe vibrations due to knocking, which might cause serious damage to the engine.

To cope with such a problem, if there is an abnormality in the knock sensing system, it is desirable to control the ignition timing in an ignition retarding sense so as to prevent an occurrence of knocking or alert the operator of the engine of such an abnormality.

SUMMARY OF THE INVENTION

Accordingly, the present invention is intended to overcome the above-described problems encountered with the conventional ignition timing control apparatuses.

It is an object of the present invention to provide a novel and improved ignition timing control apparatus for an internal combustion engine which can precisely sense an abnormality or fault in a knock sensing system.

It is another object of the present invention to provide a novel and improved ignition timing control apparatus for an internal combustion engine which can properly control the ignition timing so as to prevent any possible knocking even if there is an abnormality in the knock sensing system.

In order to achieve the above objects, according to the present invention, there is provided an ignition timing control apparatus for an internal combustion engine comprising:

a first switch for controlling the power supply to an ignition coil;

a signal generator for generating an ignition signal in synchrony with the rotation of the engine so as to open and close the switch;

a resonance type acceleration sensor for sensing a vibrational acceleration of the engine and generating a corresponding output signal;

a controller for controlling the first switch based on the output signal of the acceleration sensor so that the engine is properly ignited by means of the ignition coil;

a capacitance load having one end connected through a second switch to the output side of the acceleration sensor and the other end thereof connected to ground;

abnormality sensing means for sensing an abnormality in a knock sensing system including the acceleration sensor and the controller based on a change in the output of the acceleration sensor in response to the closure of the second switch, whereby the controller controls the first switch based on the output signal from the abnormality sensing means in such a manner that it retards the ignition timing of the engine by a prescribed extent from a normal ignition timing at which ignition takes place when there is no output from the abnormality sensor.

Preferably, the controller comprises: a buffer amplifier having an input side connected to the acceleration sensor; an analog gate for passing the output signal from the buffer amplifier when it is opened and interrupting it when closed; a gate timing controller for controlling the opening and closing of the analog gate in such a manner that the analog gate is closed for a predetermined time from each ignition of the engine; a noise level sensor for sensing the level of noise components contained in the output signal from the acceleration sensor and generating a corresponding output signal; a comparator for comparing the output signal from the analog gate with the output signal from the noise level sensor and generating an output signal if the output signal from the analog gate is higher than the output signal from the noise level sensor; an integrator for integrating the output signal from the comparator and generating a corresponding output signal; a waveform shaper for shaping the waveform of the output signal from the signal generator into a form suitable for driving the first switch; and a phase shifter for shifting the angular phase of the output signal of the waveform shaper based on the output signal from the integrator and generating a corresponding output signal to the first switch.

In a preferred form, the abnormality sensing means comprises: a second comparator for comparing the output signal from the noise level sensor with a reference voltage and generating an output signal if the output signal from the noise level sensor is greater than the reference voltage; and a third switch connected between the second comparator and the integrator so that it is closed for passing an output signal from the second comparator to the integrator to hold the output of the integrator at a constant value when the second comparator generates an output signal. In an embodiment, the reference voltage is constant. In another embodiment, the reference voltage varies in accordance with an operating condition of the engine.

The above and other objects, features and advantages of the present invention will become more readily apparent from the following detailed description of a few preferred embodiments of the invention taken in conjunction with the accompanying drawings.

BRIEF DESCRIPTION OF THE DRAWINGS

FIG. 2(a) through FIG. 2(h) are waveform diagrams showing waveforms of signals at various portions of the apparatus of FIG. 1 when there is no knocking in the engine;

FIG. 3(a) through FIG. 3(h) are waveform diagrams showing waveforms of signals at various portions of the apparatus of FIG. 1 when the engine is knocking;

In the drawings, the same or corresponding parts are identified by the same symbols.

DESCRIPTION OF THE PREFERRED EMBODIMENTS

A few preferred embodiments of the present invention will be described in detail while referring to the accompanying drawings.

Figure 1:
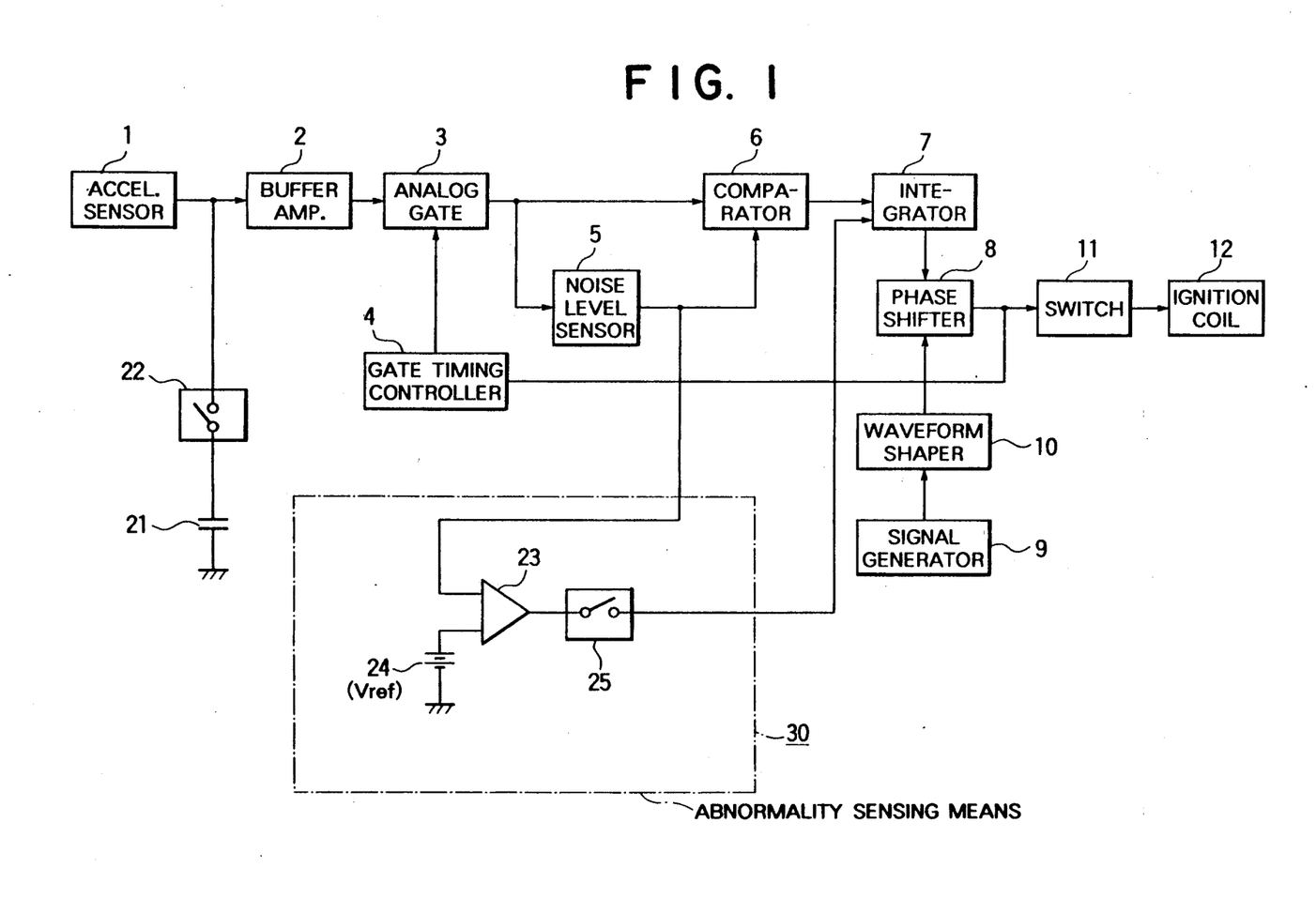
FIG. 1 is a block diagram showing the general arrangement of an ignition timing control apparatus for an internal combustion engine in accordance with the invention.

Referring to the drawings and first to FIG. 1, there is shown an ignition timing control apparatus for an internal combustion engine constructed in accordance with the present invention. The apparatus illustrated includes a knock sensor in the form of an acceleration sensor 1 mounted on an engine for sensing knocking in the form of a vibrational acceleration of the engine, a buffer amplifier 2, an analog gate 3 for removing from the output signal of the buffer amplifier 2 noise which is detrimental to sensing knocking, a gate timing controller 4 for control the opening and closing of the analog gate 3 in response to an occurrence of disturbing or interfering noise, a noise level sensor 5 for sensing the level of noise due to mechanical vibrations of the engine other than knocking and generating a corresponding output signal, a comparator 6 for making a comparison between the output voltage of the analog gate 3 and the output voltage of the noise level sensor 5 and generating an output in the form of knock pulses if the former is larger or higher than the latter, an integrator 7 for integrating the output pulses from the comparator 6 and generating an output in the form of an integrated voltage which is in proportion to the intensity or magnitude of knocking, a phase shifter 8 for shifting, in response to the output voltage of the integrator 7, the angular phase of a reference ignition signal, which is generated by a signal generator 9 at prescribed crank angles of a crankshaft of the engine in synchronism with the rotation thereof, a waveform shaper 10 interposed between the phase shifter 8 and the signal generator 9 for shaping the waveform of the output signal of the signal generator 9 into appropriate form, and a switch 11 for controlling the current supply to the ignition coil 12 based on the output signal from the phase shifter 8. The knock sensor 1 in this embodiment is in the form of a resonance type acceleration sensor utilizing a piezoelectric element which selectively outputs a specific frequency component among the vibrations of the engine.

A capacitance load 21 in the form of a capacitor has one end connected via a switch 22 to the output side of the acceleration sensor 1, and the other end thereof connected to ground.

The apparatus of this embodiment further includes an abnormality sensing means 30 for sensing an abnormality in a knock sensing system comprising the elements 1 through 6. The abnormality sensing means 30 includes a comparator 23 having a first input terminal connected to the output side of the noise level sensor 5, a second input terminal connected to a reference voltage supply 2, and an output terminal connected through a switch 25 to the input side of the integrator 7. The comparator 23 compares the output of the noise level sensor 5 with the reference voltage supplied from the reference voltage supply 24, and it generates an output of a low level to turn the switch 25 off if the output voltage of the noise level sensor 5 is larger or higher than the reference voltage. If otherwise, the comparator 23 generates an output of a high level to turn the switch 25 on.

The operation of this embodiment will now be described in detail below. First, the signal generator 9 generates, in synchronism with the rotation of the crankshaft (not shown), an engine rotational signal in the form of an ignition signal in accordance with a predetermined ignition timing characteristic of the engine. The signal from the signal generator 9 is waveform shaped by the waveform shaper 10 to provide a control pulse which is fed through the phase shifter 8 to the switch 11 so that the switch 11 is driven to turn on and off at prescribed timing to control the current supply to the ignition coil 12, thus controlling the ignition timing of spark plugs (not shown) connected thereto for the respective cylinders of the engine. Vibrations of the engine occurring during the operation thereof are sensed by the acceleration sensor 1.

Figures 2A, 2H:
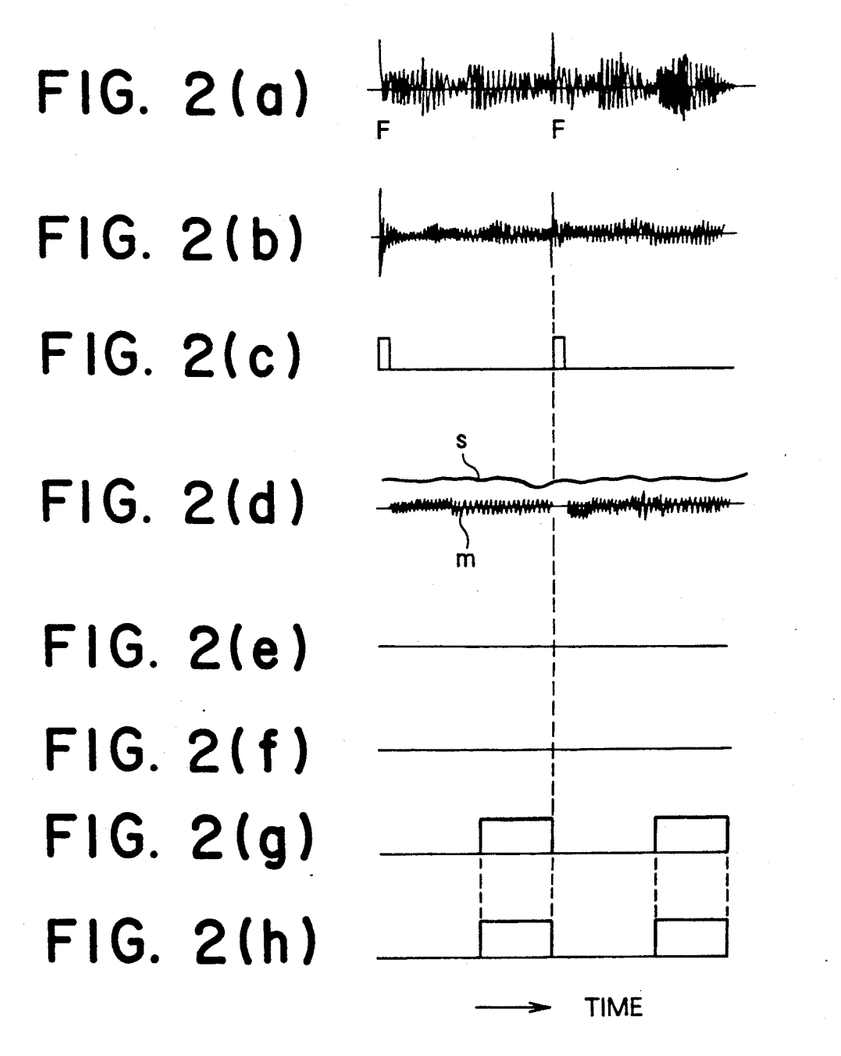

When there is no knocking in the engine, no engine vibrations are caused by knocking, but even in this case, the output signal of the acceleration sensor 1 generally contains noise comprising a mechanical noise component resulting from mechanical vibrations of the engine due to external forces applied thereto, and an ignition noise component resulting from electrical noise occurring upon ignitions of the engine. Among such noise, the mechanical noise component in the acceleration sensor output is suppressed or removed by the buffer amplifier 2 to a considerable extent, as shown by FIG. 2(b), but the ignition noise component is very strong and can not often be removed sufficiently by the buffer amplifier 2, so it can be mistaken as a knock signal. To avoid this, by an output signal from the gate timing controller 4, as shown in FIG. 2(c), which is triggered by an output of the phase shifter 8, the analog gate 3 is closed for a predetermined time from the time of each ignition to thereby interrupt or remove any ignition noise component which would otherwise be contained in the output signal from the buffer amplifier 2. As a result, there remains only a mechanical noise component of a low level in the output signal of the analog gate 3, as clearly shown by m in FIG. 2(d). On the other hand, the noise level sensor 5 has an operational characteristic of being able to respond only to a gradual change in the peak level of the output signal of the analog gate 3 due to normal mechanical noise, and it generates a DC voltage s which is slightly higher than the peak value of the mechanical noise component m, as shown in FIG. 2(d). Accordingly, the output s of the noise level sensor 5 is greater or higher than an ordinary or average peak value of the output signal of the analog gate 3, as illustrated in FIG. 2(d), so the comparator 6 generates no output or an output signal of a low level, as shown in FIG. 2(e). In this manner, all the noise components in the output signal of the acceleration sensor 1 are removed. Accordingly, the output voltage of the integrator 7 remains zero, as shown in FIG. 2(f), and there is no phase shift between the input signal (see FIG. 2(g)) and the output signal (see FIG. 2(h)) of the phase shifter 8, so that the switch 11 is operated to open and close by the output signal of the phase shifter 8 which is the same as the output signal of the waveform shaper 10. Thus, the current supply to the ignition coil 12 is controlled by the switch 11 on the basis of the output signal of the signal generator 9 with the result that ignitions due to the ignition coil 12 are caused at prescribed reference ignition instants which are determined by the output signal or ignition signal of the signal generator 9.

Figure 3A:
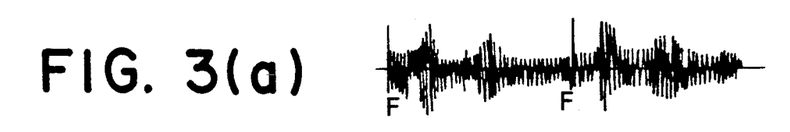
Figure 3B:
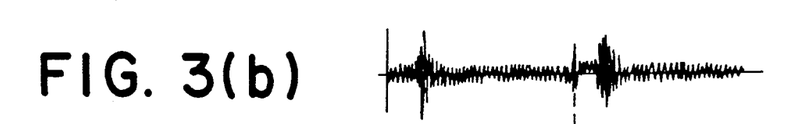
Figure 3C:
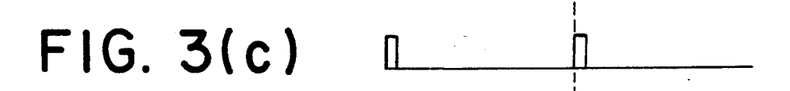
Figure 3D:
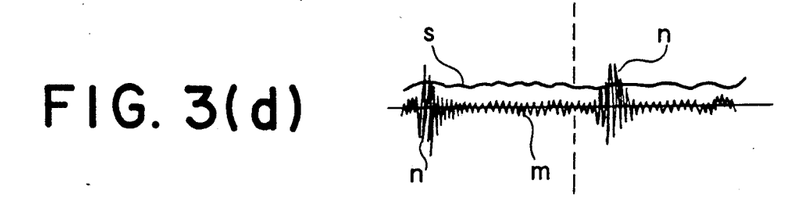
Figure 3E:
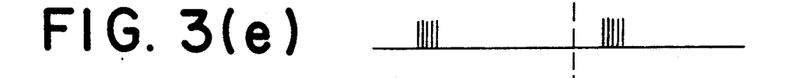
Figure 3F:
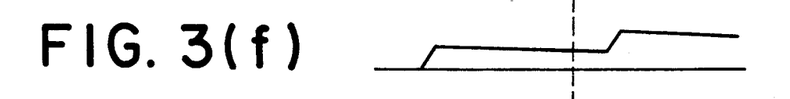
Figure 3G:
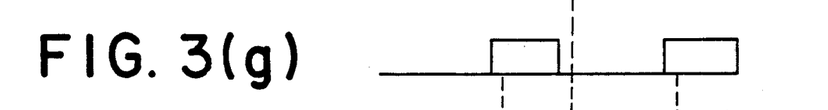
Figure 3H:
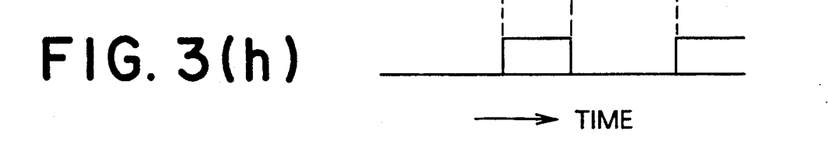

On the contrary, if there arises knocking in the engine, the output signal of the acceleration sensor 1 contains a knock component or pulse at a point in time later a predetermined time than an ignition instant, as shown in FIGS. 3(a) through 3(b), so the output signals of the buffer amplifier 2 and the analog gate 3 contain a mechanical noise component m superposed by a knock component n, as shown by in FIGS. 3(d). In this connection, since the knock component n in the output signal of the analog gate 3 rises sharply, the output voltage of the noise level sensor 5 responds with a certain delay to the knock component n. As a result, the output signal of the noise level sensor 5 input to the second input terminal of the comparator 6 contains an average DC component s whereas the output signal of the analog gate 3 input to the first input terminal of the comparator 6 contains a low-level mechanical noise component m superposed by a knock component n, which is greater or higher than the DC component s, as shown in FIG. 3(d). Accordingly, the comparator 6 generates an output signal of a high level as long as the knock component n is higher than the DC component s, as illustrated in FIG. 3(e). The integrator 7 integrates the output signal of the comparator 6 to generate an integrated voltage, as shown in FIG. 3(f). Based on the output voltage of the integrator 7, the phase shifter 8 shifts the angular phase of the output signal of the waveform shaper 10 in a retarded sense, as shown in FIG. 3(g), to generate an output signal which is retarded by an angle proportional to the integrator output voltage from the reference ignition signal of the waveform shaper 10. As a result, the switch 11 is driven to open and close in a delayed manner with respect to the reference ignition signal, as shown in FIG. 3(h), thus properly retarding the ignition timing for suppression of the knocking.

In this manner, the ignition timing is optimally controlled in accordance with a normal ignition control mode as shown in FIG. 2(a) through FIG. 2(h) for performing normal ignition when there is no knocking, and with a retarded ignition control mode as shown in FIG. 3(a) through FIG. 3(h) for suppressing knocking when the engine is knocking.

Next, the operations of the acceleration sensor 1, the capacitor 21 and the abnormality sensing means 30 will be described below.

An example of the knock sensor 1 as employed in the present invention is a resonance type acceleration sensor having a circular plate fixedly mounted at its outer periphery on an engine block. This type of acceleration sensor generates an output signal which is subject to little changes even if a capacitor is connected to the output side of the sensor.

Figure 4:
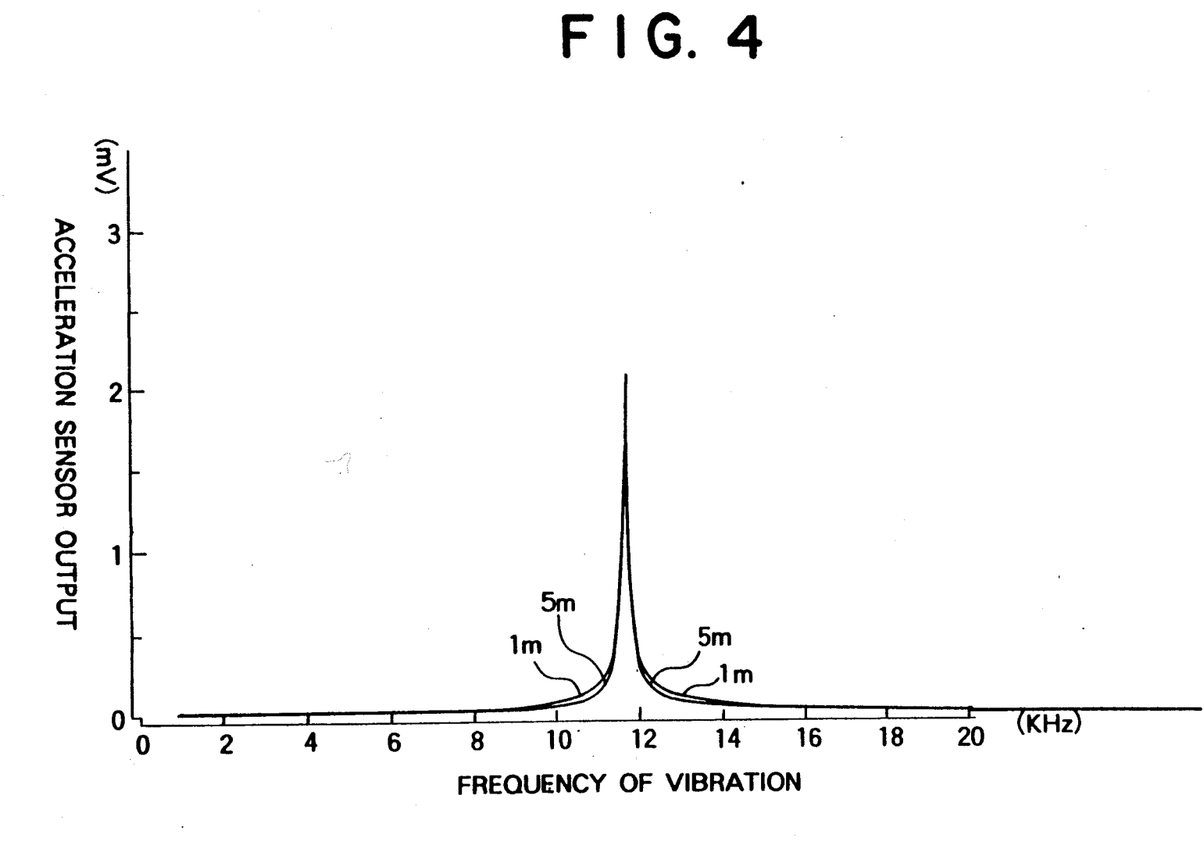
FIG. 4 is a graphical representation showing an output characteristic (i.e., the relationship between the sensor output voltage and the frequency of vibrations of the engine) of a knock sensor of FIG. 1 with the capacitance of a capacitor connected to the knock sensor being changed.

FIG. 4 shows the output voltage of the resonance type acceleration sensor with respect to the frequency of vibrations caused by accelerations in which a capacitor in the form of a shielded wire is connected to the output side of the sensor. The wire has a unit capacitance of 300 pF/m, and the length of the wire is changed between 1 m and 5 m. As can be seen from FIG. 4, the output voltage of the acceleration sensor is substantially constant even if the capacitance of the capacitor connected to the output side of the sensor varies.

Figure 5:
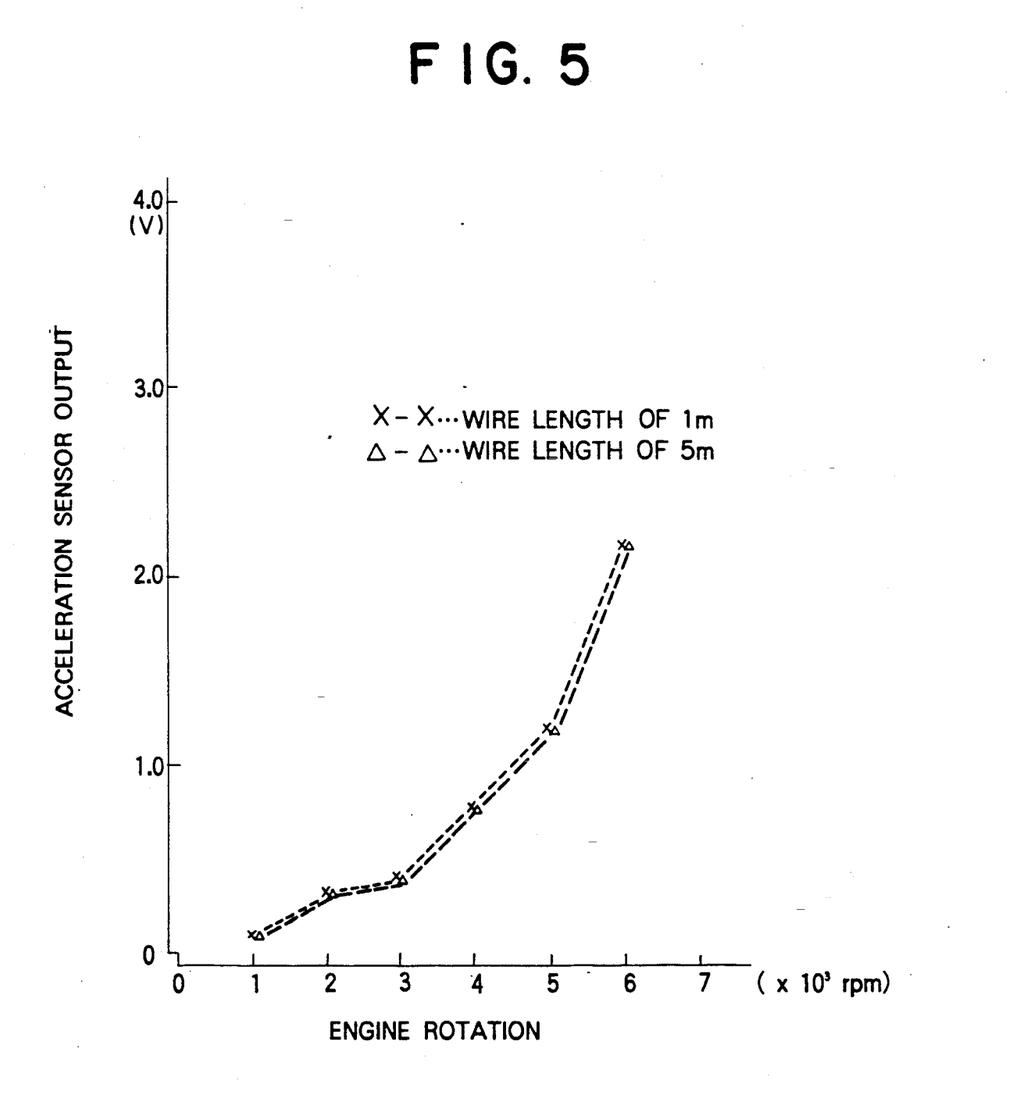
FIG. 5 is a graphical representation showing another output characteristic (i.e., the relationship between the sensor output voltage and the rpm of the engine) of the knock sensor of FIG. 1 with the capacitance of the capacitor connected to the knock sensor being changed.

FIG. 5 shows the output voltage of the resonance type acceleration senor with respect to the number of revolutions per minute of the engine in which the capacitance of the capacitor connected to the output side of the sensor is changed in the same manner as in FIG. 4. In this case, too, the output voltage of the acceleration sensor is substantially constant even with a great change in the capacitance of the capacitor.

As illustrated in FIG. 1, the capacitor 21 is connected through the switch 22 to the output side of the acceleration sensor 1 for the purpose of determining whether the acceleration sensor 1 is normal or abnormal, but in this case, there is no significant change in the output signal of the acceleration sensor 1 which is input to the buffer amplifier 2, as referred to above.

Figure 6A:
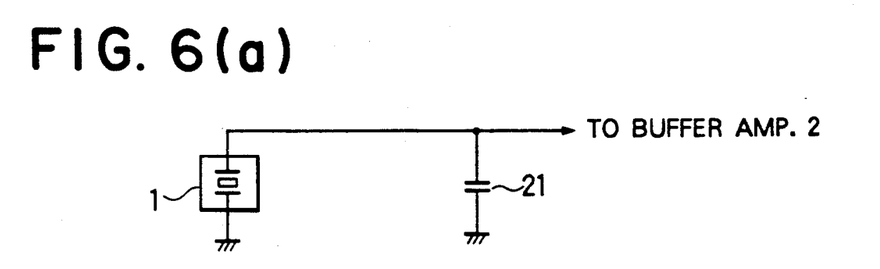
FIG. 6(a) is an explanatory view showing that there is no break in wiring connecting between the knock sensor and the capacitor.

First, let us consider the case in which the knock sensing system is normal as illustrated in FIG. 6(a). In this case, since there is no substantial change in the output signal of the acceleration sensor 1 caused by the capacitor 21 connected to the output side thereof, the output of the noise level sensor 5, which is a reference comparison voltage (hereinafter referred to as a background level (BGL) input to the second input terminal of the comparator 6, remains substantially unchanged when the switch 22 is turned on. In addition, the output BGL of the noise level sensor 5, which is also input to the first input terminal of the comparator 23 of the abnormality sensing means 30, is higher than the reference voltage Vref of the reference voltage supply 24 which is imposed on the second input terminal of the comparator 23, so that the comparator 23 remains inoperative or generates an output of a low level, turning the switch 25 off.

Figure 6B:
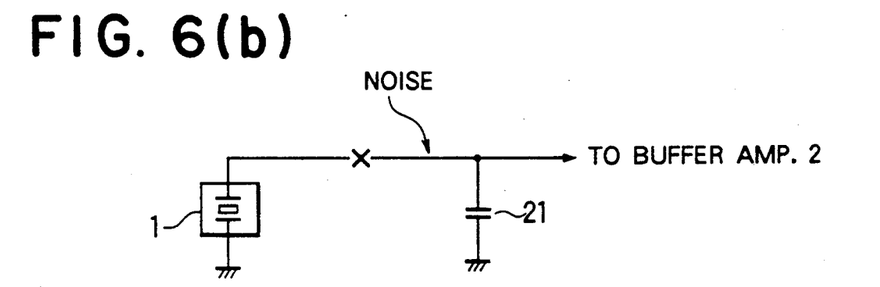
FIG. 6(b) is an explanatory view showing that there is a break in wiring connecting between the knock sensor and the capacitor.

Next, let us consider the case in which there is an abnormality in the knock sensing system such as a break in wiring connecting between the acceleration sensor 1 and the buffer amplifier 2, as shown in FIG. 6(b). In this case, the elements 2 through 11 of FIG. 1 are generally incorporated in a control unit (not shown), and hence the capacitor 21 is connected to the input side of the buffer amplifier 2. Accordingly, such a break in wiring generally takes place at a location between the sensor 1 and a junction at which the capacitor 21 is connected to the wiring connecting between the sensor 1 and the buffer amplifier 2. For example, it can be a break in a wire harness connecting between the acceleration sensor 1 and the unillustrated control unit. If such a break takes place, the output BGL from the noise level sensor 5 falls below the reference voltage Vref of the reference voltage supply 24 so that the comparator 23 generates an output signal of a high level, thus turning the switch 25 on. In this manner, the abnormality sensing means 30 generates an abnormality signal which is input to the integrator 7 to hold the output thereof at a constant level. As a result, based on the constant output of the integrator 7, the phase shifter 8 shifts the angular phase of the output signal of the waveform shaper 10 by a prescribed angle of retardation which is determined by the integrator output, whereby the ignition timing is accordingly retarded from the normal ignition timing determined the ignition signal from the signal generator 9 for suppressing knocking in the engine if it occurs.

Figure 6C:
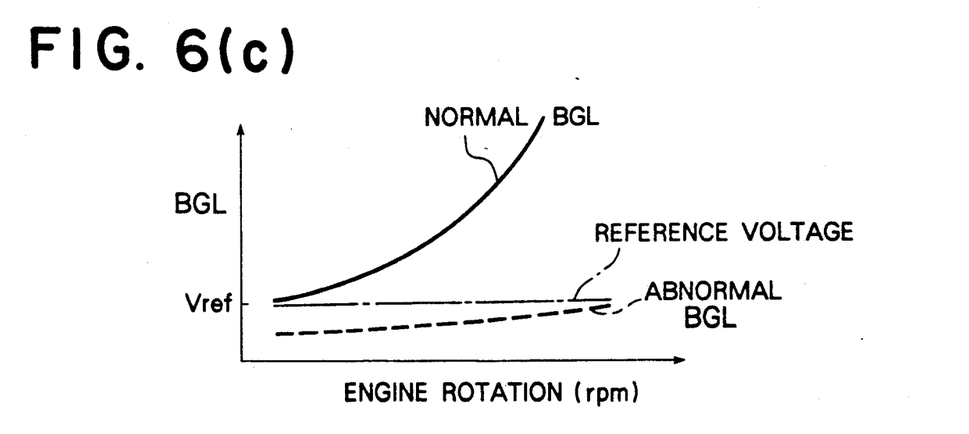
FIG. 6(c) is a graphical representation showing a constant reference voltage and the output BGL of a noise level sensor of FIG. 1 when a knock sensing system is normal and abnormal, respectively.

In this regard, although the reference voltage Vref of the reference voltage supply 24 is in principle set to a value lower than the output BGL which is generated by the noise level sensor 5 when the knock sensing system is normal, as referred to above, the BGL tends to gradually increase with the increasing number of revolutions per minute of the engine, as shown in the dashed line in FIG. 6(c), since the amount of electrical noise input to the buffer amplifier 2 increases as the rpm of the engine increases. In other words, it is difficult to set the reference voltage Vref at a constant value which is effective over the entire operating speed range of the engine. It is therefore necessary to set the reference voltage Vref to a value which is lower than a minimum value of the BGL during the normal operating state of the knock sensing system over the entire operating range of the engine, and which is higher than a maximum value of the BGL at the time of a failure in the knock sensing system. Basically, this is also true from a point of view of the characteristic of the BGL with respect to the engine load over operating ranges of the engine for a variety of kinds of engine control.

Figure 7:
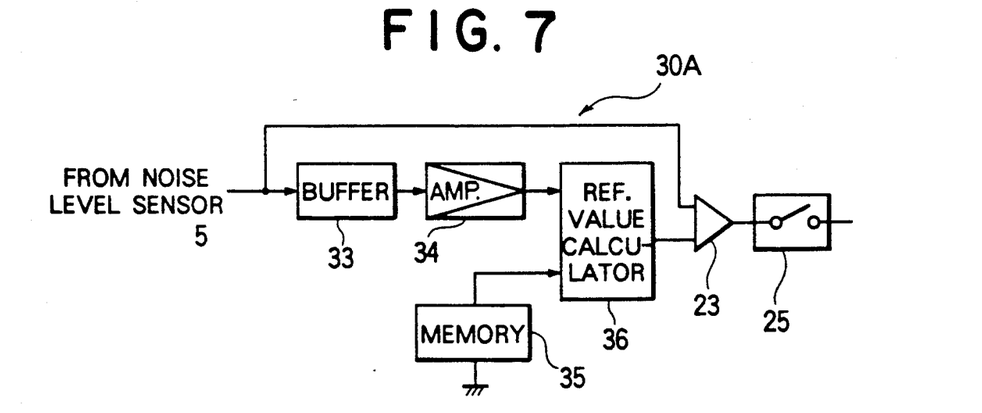
FIG. 7 is a block diagram showing a modified form of abnormality sensing means of the invention.

FIG. 7 shows, in a block diagram, a modified form of abnormality sensing means in accordance with the present invention. In this modification, a reference voltage map is in advance prepared in which the reference voltage Vref is plotted with respect to an operating range of an engine, and a reference voltage as selected from the map is modified by a BGL, which is determined based on the output of the acceleration sensor 1, so that it can be set to a value most suitable to the engine. In this regard, whether such modification can be made is determined as follows. Namely, such modification can be made if there is substantially no change in the output of the acceleration sensor 1 when the switch 22 is switched on to connect the capacitor 22 to the output side of the acceleration sensor 1, or if the knock sensing system is determined to be normal such as when knock control is performed in a high-load range of the engine.

Figure 8:
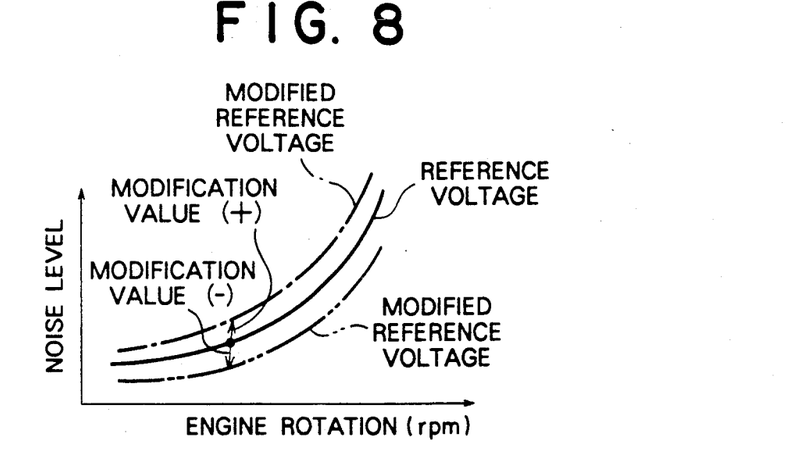
FIG. 8 is a graphical representation showing a reference voltage stored in a reference voltage map memory of FIG. 7 as well as modified reference voltages calculated by a reference voltage modifier of FIG. 7.
Figure 9:
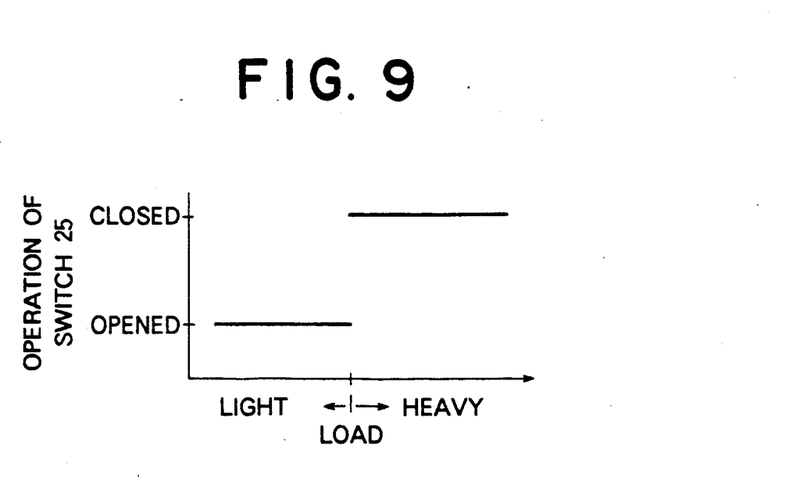
FIG. 9 is a graphical representation showing the switching operation of a switch of the abnormality sensing means with respect to the engine load.

In order to attain the above, in this modified form of abnormality sensing means 30A, the reference voltage supply 24 of FIG. 1 is replaced by a buffer 33, an amplifier 34, a memory 35 for storing a reference voltage map, and a reference value calculator 36. More specifically, the abnormality sensing means 30A of this modification includes, in addition to the above elements 33 through 36, a comparator 23 having a first input terminal connected to the output side of the noise level sensor 5, a second input terminal connected to an output terminal of the reference value calculator 36 and an output terminal, and a switch 25 having one end thereof connected to the output terminal of the comparator 23 and the other end thereof connected to the input side of the integrator 7 of FIG. 1. The buffer 33 has an input side thereof connected to the output side of the noise level sensor 5 of FIG. 1, and an output side connected through the amplifier 34 to a first input terminal of the reference value calculator 36 which has a second input terminal connected to the reference voltage map memory 35. The output BGL of the noise level sensor 5 is input through the buffer 33 and the amplifier 34 to the first input terminal of the reference value calculator 36 which, in a learning condition in which the operating condition of the engine continues to lie within a prescribed operating range (which is determined by the calculator 36 based on the various outputs from various sensors representative of various aspects of the engine operation such as the rpm of the engine, the engine load, the engine temperature, the temperature and amount of intake air, etc.), finds an appropriate reference voltage based on certain engine operating parameters such as engine rpm while looking at the reference voltage map stored in the memory 35, calculates a value of modification based on the BGL from the noise level sensor 5 and the engine operating parameters, and modifies the above found reference voltage by the thus calculated value of modification to provide a modified or corrected reference voltage, as shown in FIG. 8, which is then fed to the second input terminal of the comparator 23. The value of modification can be arbitrarily set in respective engine operating ranges on the basis of a basic relationship between a normal BGL, which is the output of the noise level sensor 5 when the knock sensing system is normal, and an abnormal BGL, which is the output of the noise level sensor 5 when the knock sensing system is abnormal. The normal and abnormal BGLs can in advance be predetermined on the basis of the operating characteristics of the engine, as well as the construction and characteristics of an engine control system, as exemplarily shown in FIG. 6(c). Based on the thus predetermined normal and abnormal BGLs, the range (i.e., a maximum) of the value of modification can be determined, e.g., the maximum value of modification is a larger one of the difference between the normal BGL and the not modified reference voltage, and the difference between the not modified reference voltage and the abnormal BGL. In this regard, using such a range of the value of modification, the abnormality sensing means 30A can be determined to be abnormal if the value of modification calculated by the reference value calculator 36 exceeds the modification value range.

One example of the output characteristics of the reference value calculator 36 is shown in FIG. 8, in which a curve designated by a solid line represents a reference voltage which is stored in the reference voltage map memory 35 and plotted against the noise level and the rpm of the engine; a curve designated by a one-dot and dashed line represents a modified reference voltage which is the reference voltage plus a value of modification; and a curve designated by a two-dots and dashed line represents a modified reference voltage which is the reference voltage minus a value of modification.

In the above embodiments, knock control is generally performed for protecting an engine from damage due to knocking when the operation of the engine is in a knock control range. Accordingly, the switch 25 is controlled to open in a light load range in which the engine load is light, and close in a heavy load range in which the engine load is heavy, so that the output of the comparator 23 representative of an abnormality in the knock sensing system is input to the integrator 7 of FIG. 1 only when the engine load is higher than a prescribed value.

What is claimed is:

1. An ignition timing control apparatus for an internal combustion engine comprising:
   a first switch for controlling the power supply to an ignition coil;
   a signal generator for generating an ignition signal in synchrony with the rotation of the engine so as to open and close said switch;
   a resonance type acceleration sensor for sensing a vibrational acceleration of the engine and generating a corresponding output signal;
   a controller for controlling said first switch based on the output signal of said acceleration sensor so that the engine is properly ignited by means of the ignition coil;
   a capacitance load having one end connected through a second switch to the output side of said acceleration sensor and the other end thereof connected to ground;
   abnormality sensing means for sensing an abnormality in a knock sensing system including said acceleration sensor and said controller based on a change in the output of said acceleration sensor in response to the closure of said second switch, whereby said controller controls said first switch based on the output signal from said abnormality sensing means in such a manner that it retards the ignition timing of the engine by a prescribed extent from a normal ignition timing at which ignition takes place when there is no output from said abnormality sensor.

2. An ignition timing control apparatus according to claim 1, wherein said controller comprises:
   a buffer amplifier having an input side connected to said acceleration sensor;
   an analog gate for passing the output signal from said buffer amplifier when it is opened and interrupting it when closed;
   a gate timing controller for controlling the opening and closing of said analog gate in such a manner that said analog gate is closed for a predetermined time from each ignition of the engine;
   a noise level sensor for sensing the level of noise components contained in the output signal from said acceleration sensor and generating a corresponding output signal;
   a comparator for comparing the output signal from said analog gate with the output signal from said noise level sensor and generating an output signal if the output signal from said analog gate is higher than the output signal from said noise level sensor;
   an integrator for integrating the output signal from said comparator and generating a corresponding output signal;
   a waveform shaper for shaping the waveform of the output signal from said signal generator into a form suitable for driving said first switch; and
   a phase shifter for shifting the angular phase of the output signal of said waveform shaper based on the output signal from said integrator and generating a corresponding output signal to said first switch.

3. An ignition timing control apparatus according to claim 2, wherein said abnormality sensing means comprises:
   a second comparator for comparing the output signal from said noise level sensor with a reference voltage and generating an output signal if the output signal from said noise level sensor is greater than the reference voltage; and
   a third switch connected between said second comparator and said integrator so that it is closed for passing an output signal from said second comparator to said integrator to hold the output of said integrator at a constant value when said second comparator generates an output signal.

4. An ignition timing control apparatus according to claim 3, wherein the reference voltage is constant.

5. An ignition timing control apparatus according to claim 3, wherein the reference voltage varies in accordance with an operating condition of the engine.

* * * * *